Dec. 31, 1946.    O. W. DAWSON    2,413,436
GRINDING MACHINE
Filed Oct. 24, 1942    4 Sheets-Sheet 1
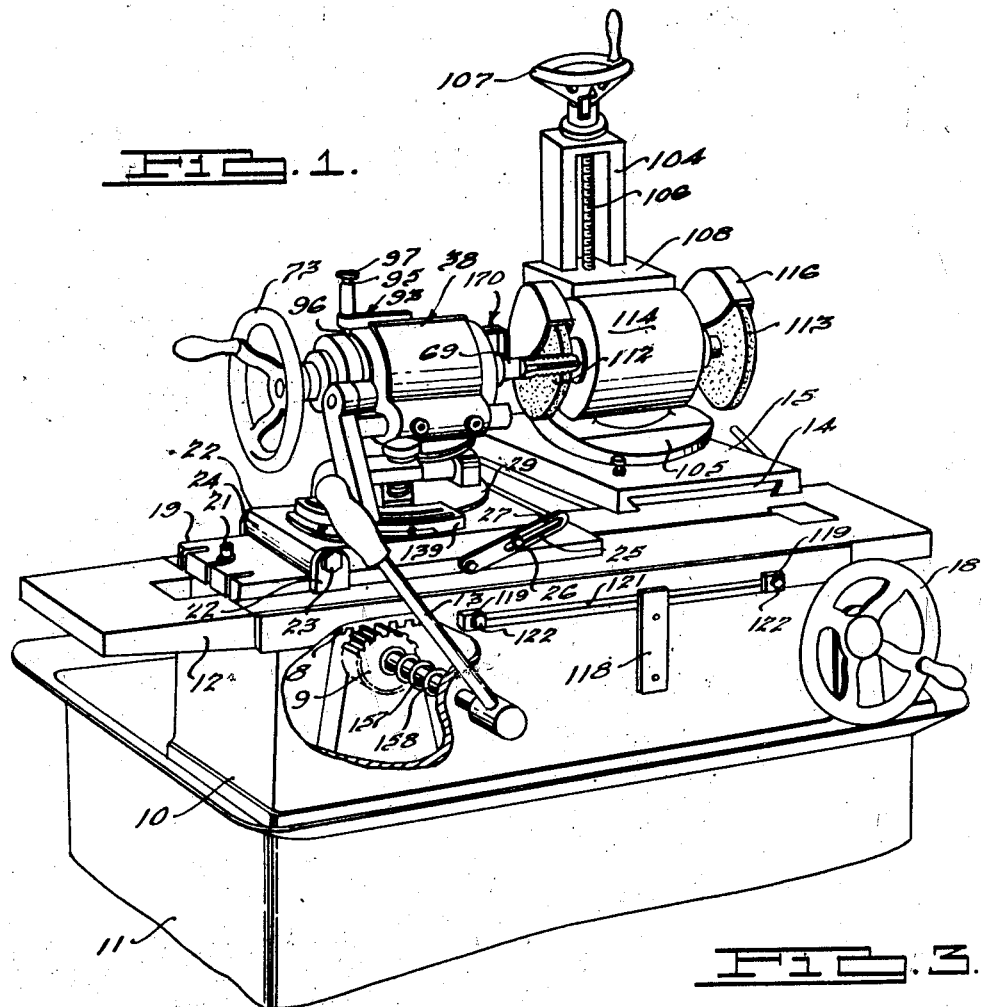
INVENTOR
Orlie W. Dawson.
BY
Harness, Dickey & Pierce.
ATTORNEYS.

Dec. 31, 1946.     O. W. DAWSON     2,413,436
GRINDING MACHINE
Filed Oct. 24, 1942     4 Sheets-Sheet 2
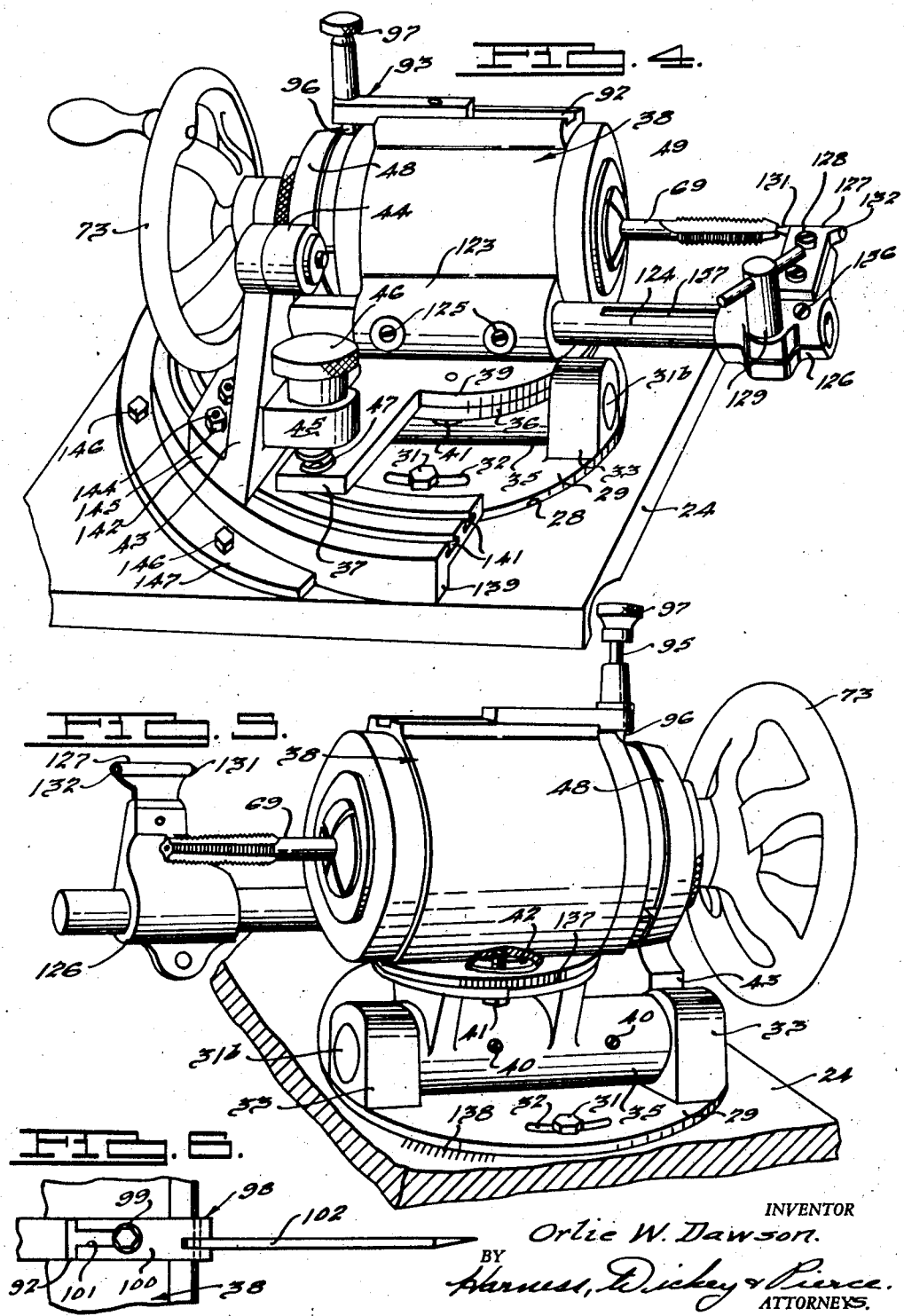
INVENTOR
Orlie W. Dawson.
BY
Harness, Dickey & Pierce.
ATTORNEYS.

Dec. 31, 1946.  O. W. DAWSON  2,413,436
GRINDING MACHINE
Filed Oct. 24, 1942  4 Sheets-Sheet 3
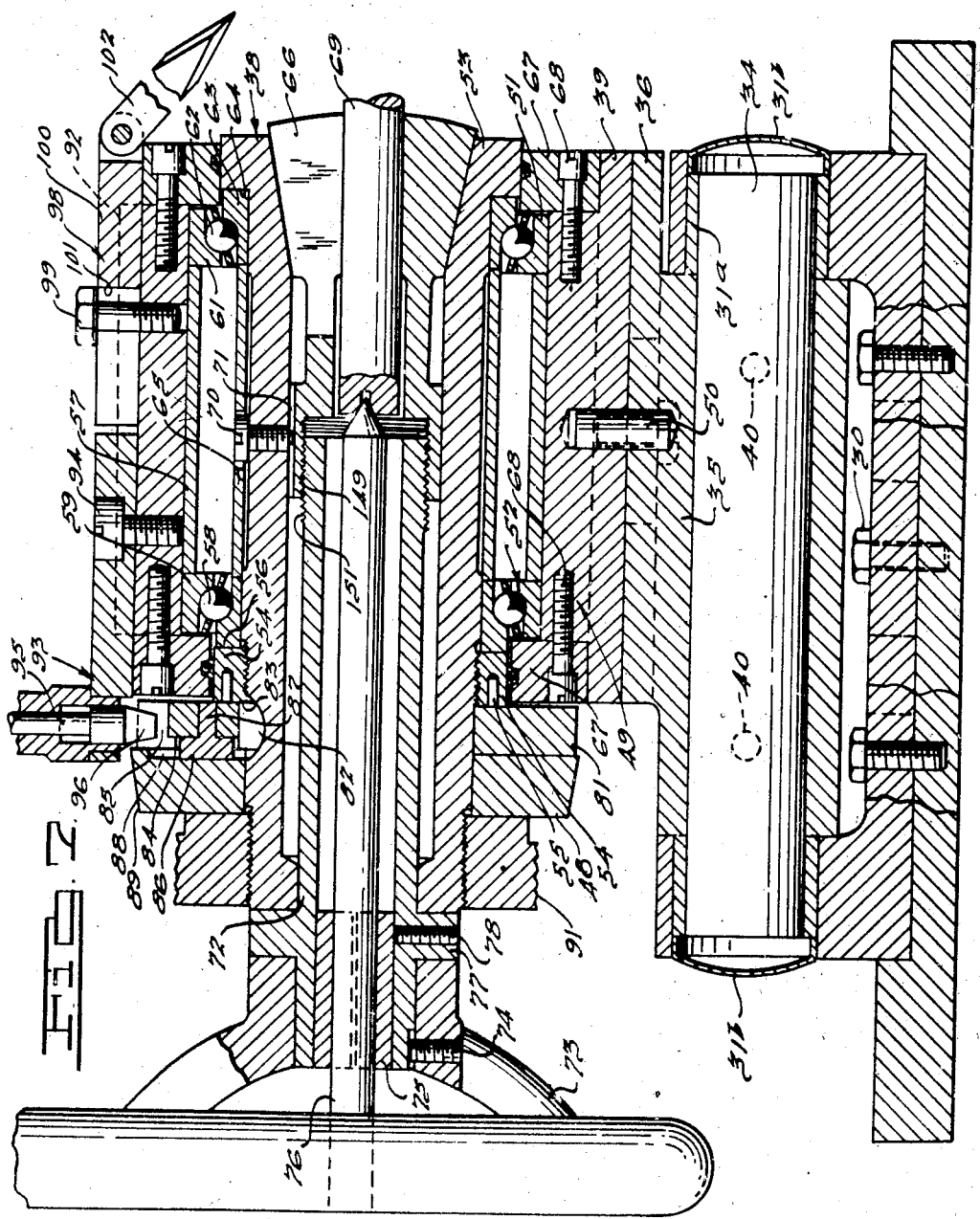
INVENTOR
Orlie W. Dawson.
BY Harness, Dickey & Pierce
ATTORNEYS.

Dec. 31, 1946.   O. W. DAWSON   2,413,436
GRINDING MACHINE
Filed Oct. 24, 1942   4 Sheets-Sheet 4
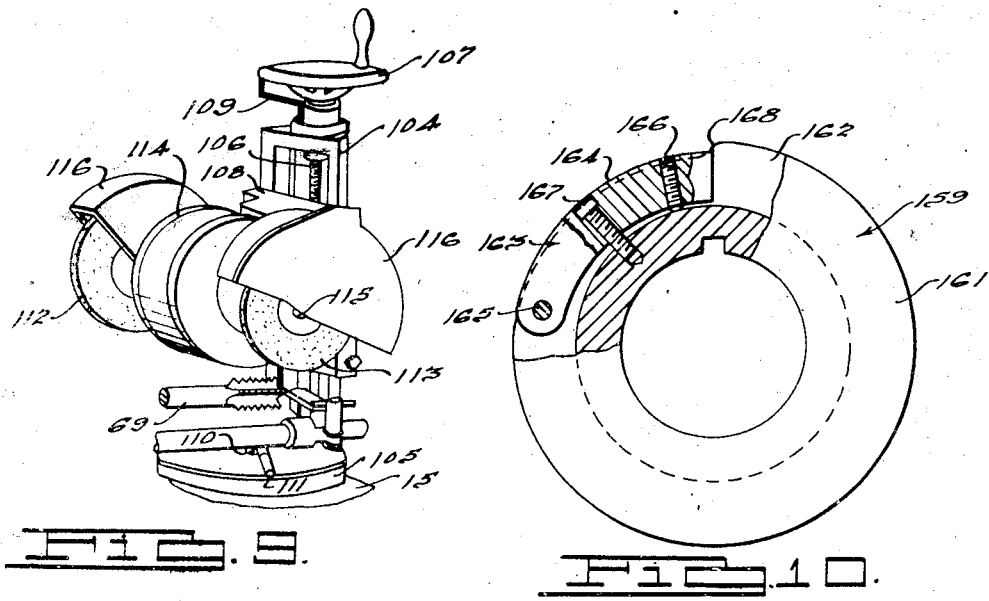
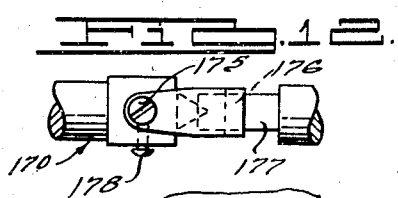
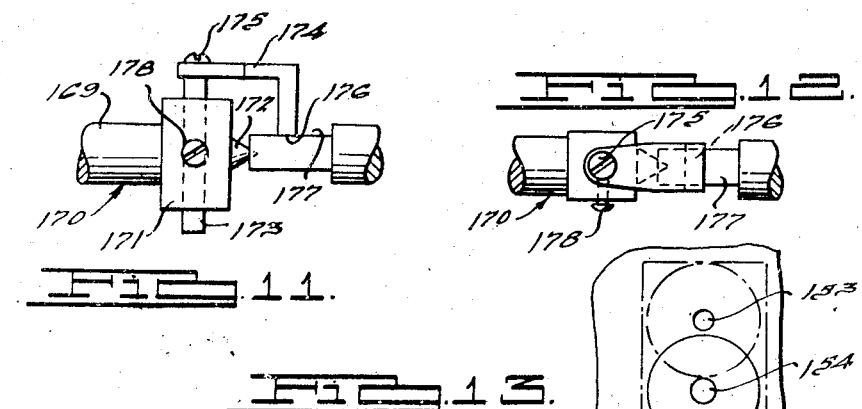
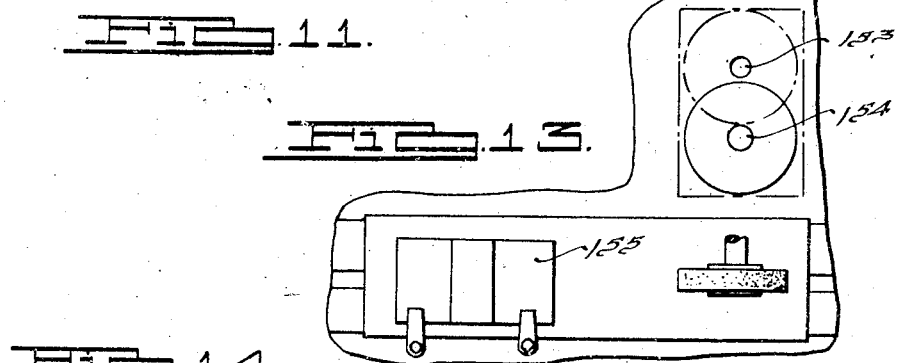
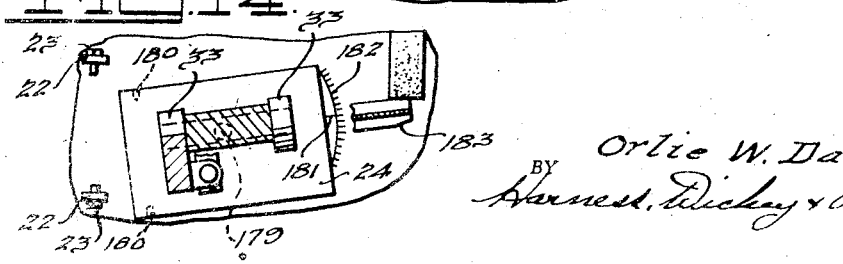
INVENTOR
Orlie W. Dawson.
BY
Harness, Dickey & Pierce
ATTORNEYS.

Patented Dec. 31, 1946

2,413,436

UNITED STATES PATENT OFFICE 2,413,436

GRINDING MACHINE

Orlie W. Dawson, Ferndale, Mich.

Application October 24, 1942, Serial No. 463,157

21 Claims. (Cl. 51—94)

1

This invention relates to grinding machines, and particularly to a universal type of grinding machine which is capable of grinding flat as well as round workpieces and of sharpening and relieving cutting edges of tools.

The invention pertains to an oscillatable head for the tool which supports a tool in position to be operated upon by a grinding wheel. The wheel may be disposed on the axis of the head to grind flutes or splines in the tool body parallel to the axis or at an angle thereto when the tool supporting head is tilted on its base. Relief may be provided to a tool by oscillating the head and tool when a handwheel is rotated to rotate a cam having cam surfaces which oscillate the head in accordance with the number of cutting edges and reliefs to be provided thereon.

In view of the cramping action which occurs to the head when oscillating the head with a cam having lobes disposed parallel to the cam axis, the invention embodies the use of a cam of truncated conical shape with the cam lobes thereon disposed at an angle substantially equal to the angular offset of the trunnions to the axis of the tool.

Accordingly, the main objects of the invention are: to provide a grinding machine which is universal in operation; to provide a grinding machine which may be employed to grind flat or circular workpieces and to sharpen and relieve cutting edges of cylindrical tools; to provide a head on the machine which may be set off at an angle corresponding to the angle of the point to be ground on the tool and oscillate the tool to produce relief to the point; to provide an oscillating head, the trunnions of which may be set off at an angle to the axis and adjustable to have the workpiece properly presented to the grinding wheel to produce forward and lateral movement to the tool from the single cam plate during each oscillation to simultaneously grind radial and angular relief to the cutting edges; to provide a head which may be tilted at an angle to the grinding wheel to grind sloping lands in the body of the tool; to provide a motor supporting riser on a platen in both forward and rearward position to have the grinding wheels adjustable vertically as well as angularly thereon and movable forwardly and rearwardly with the platen; to form the cam lobes on the cam plate from a single master cam constructed from a circular plate having a peripheral slot in which an arcuate sector is provided struck from a circle of smaller radius than the plate; and in general, to provide a grinding machine of the universal type, which is simple

2 in construction, positive in operation, and economical of manufacture.

Other objects and features of novelty of the invention will be either specifically pointed out or will become apparent when referring, for a better understanding of my invention, to the following description taken in conjunction with the accompanying drawings, wherein:

Figure 1 is a broken perspective view of a machine embodying features of this invention;

Fig. 2 is a view in elevation of the index and cam plates employed on the machine illustrated in Fig. 1;

Fig. 3 is a broken sectional view of the tiltable base of the work supporting head illustrated on the machine of Fig. 1;

Fig. 4 is an enlarged perspective view of the head of the machine illustrated in Fig. 1;

Fig. 5 is a perspective view of the head illustrated in Fig. 4, taken on the opposite side thereof;

Fig. 6 is a broken plan view of a gauging element employed for positioning the tool in the head illustrated in the foregoing figures;

Fig. 7 is an enlarged sectional view of the oscillating head of the machine illustrated in Fig. 1;

Fig. 8 is a broken view in elevation of one form of tool which may be dressed on the machine illustrated in the figures.

Fig. 9 is a broken view of a structure similar to that illustrated in Fig. 1, showing a further form of the invention;

Fig. 10 is a broken sectional view of an adjustable cam element, for producing the cam rings employed with the machine illustrated in Fig. 1;

Fig. 11 is a view in elevation of a combination center and dog employed to support and drive a workpiece;

Fig. 12 is a plan view of the structure illustrated in Fig. 11;

Fig. 13 is a broken plan view of the machine illustrated in Fig. 1, showing a further use thereof; and Fig. 14 is a sectional view of a work supporting head, illustrating a further form which this invention may assume.

The base 10 of the machine may be mounted on a bench, or upon a pedestal 11, and is provided with ways upon which a main platen 12 is reciprocated. An operating handle 13 extends from the side of the base 10 and is connected to the platen through a rack 8 and pinion 9. The pinion 9 is mounted on a shaft 157, to which the operating handle 13 is secured. The shaft 157 is axially movable in its bearings, and is urged by a spring 158 to force the pinion 9 into aligned relation with the rack 8. By this arrangement the handle 13 and shaft 157 may be pulled outwardly of the base 10 to disengage the pinion 9 from the rack, so that the handle may be turned to a different position and the pinion moved to again engage the rack. After the disengagement of the pinion, the table to which the rack 8 is attached may be shifted in the ways on the base 10 to position the workpiece relative to the grinding wheel, after which the pinion and rack are again engaged.

The base 10 supports a dove-tailed element 14, upon which a motor riser supporting platen 15 is mounted, having a forward and rearward supporting position capable of producing various types of grinding, as will be explained hereafter. A handwheel 18 operates a lead screw which has threaded relation with a nut (not shown) on the platen 15 for positioning the platen at any point on a line at right angles to the direction of movement of the platen 12. The platen 12 has a sub-base 19 secured thereto by bolts 21 and a pair of bosses 22 extending upwardly from the side edge of the sub-base. Studs 23 project through the bosses 22 and have their ends projected into apertures in the side of a base 24 of a fixture which pivots on the studs when tilted upwardly, as illustrated in Fig. 3. A pair of pivotal links 25 have studs 26 extending through slots 27 therein and into the base 24, for the purpose of clamping the base 24 in horizontal or any angular position.

The base 24 of the fixture has an annular recess 28 in which a circular plate 29 is disposed for adjustment about a central pin 30. Screws 31 extend through arcuate slots 32 in the plate 29 into the base 24, for clamping the plate and base together in adjusted relation. The plate 29 has a pair of trunnion bearings 33 extended upwardly therefrom and containing "Oilite" bearings 31a which are sealed at the ends with Welch plugs 31b. The bearings 31a support a shaft 34 upon which a sleeve 35 of an oscillatory head 38 is secured by screws 40. The shaft oscillates in the bearings in the trunnions 33 and oscillates an annular plate 36 therewith which is secured to the sleeve 35.

The oscillating head 38 for supporting the workpiece has an annular base 39 of the same diameter as the plate 36, on which it is supported for adjustment about a central pin 50. The plate and base are secured in adjusted position by bolts 41 which extend through arcuate slots 42 in the plate 36 and thread into the plate 39. The plate 29 of the head 38 may be adjusted relative to the base 24 and the base 39 of the head 38 may be adjusted on the plate 36, all for the purpose which will be explained hereinafter. Index marks 137 may be provided between the base 39 and plate 36, while index marks 138 may be provided between the plate 29 and the base 24, as illustrated in Fig. 5, for aid in the setting of the plates and bases relative to each other.

A bracket 43 is mounted on a base element 139 of arcuate shape, having T-shaped slots 141 disposed on an arc struck about the center of the pin 30 of the base 29. A flange 142 on the bracket 43 has a pair of bolts 144, the heads of which project within the T-slots 141 and which clamp the bracket 43 in adjusted position when secured by nuts 145. The base element 139 is secured to the base 24 by bolts 146 which project through a flange 147 on the element. The bracket 43 has a ball-bearing mounted roller 44 projecting from one side thereof and a boss 45 extending from the same side below the roller. An arm 37 projects from the base 39 in position to be aligned with the boss 45 to which it is joined by a spring 47, the tension of which may be adjusted by a thumb nut 46 which is threaded into the boss.

The roller 44 engages a cam plate 48 which produces the oscillating movement to the head 38 against the tension of the spring 47 which urges the head, and therefore the cam plate 48, against the roller 44 at all times. To prevent a cramping action from occurring between the roller and the cam plate 48, the cam plate is constructed in the shape of a truncated conical section to present a sloping face to the roller 44 which is set off to contact the face along a line across the width of the cam plate.

Referring more specifically to Fig. 7, the head 38 embodies a housing 49 secured to or made part of the base 39. A pair of ball bearings 51 and 52 are mounted within the housing 49 on which a sleeve 53 is mounted. An adjustment ring 54 having slots 55 for receiving a Spanner or other wrench, is threaded upon the sleeve 53 and tightened against the inner race 56 of the ball bearing 52. This applies a pressure to a sleeve 57 through the balls 58 and the outer race 59 of the bearing. The sleeve 57 applies pressure to the outer race 61 the balls 62 and the inner race 63 of the bearing 51. The race 63 is abutted against a shoulder 64 in the sleeve 53 and an inner sleeve 65 is disposed between the inner races 56 and 63 of the two bearings for regulating the amount of pressure which may be applied to the balls. The balls 58 and 62 of the two bearings 51 and 52 are in this manner preloaded a predetermined amount to provide stability and to prevent any side or end movement to the collet 66 and the workpiece supported thereby.

Washer-like end caps 67 are secured to the ends of the housing 49 by a plurality of screws 68 and are provided with grooves in the inner peripheral surface in which dust-proof felt rings are disposed in contact with the outer surface of the sleeve 53. The collet 66 is located and secured against annular movement by a locating screw 70, which has its inner end projecting in a slot 71 in the collet. The inner end of the collet is hollow and contains an internal thread 149 with which a thread 151 of a hollow draw bar 72 engages. A handwheel 73 is secured to the outer end of the draw bar 72 by a screw 74. A split sleeve 75 extends within the outer end of the hollow draw bar 72, through which a positioning rod 76 extends. An annular shoulder 77 on the draw bar 72 abuts against the outer end of the sleeve 53 and is provided with a screw 78 which clamps the sleeve 75 to the draw bar 72 and the adjusting rod 76. The rod 76 and the split sleeve 75 can be removed from the draw bar 72 to permit the shank of a tool to extend into or through the draw bar.

The adjusting rod 76 is employed as a stop so that a plurality of like tools may be ground to exactly the same length as is required in a multiple tool set up.

When the sleeve 53 is held against rotation by the index plate and pin, referred to hereinafter, the workpiece 69 is tightly clamped within the collet 66 when the handwheel 73 is rotated. The collet may be released or removed from the sleeve by rotating the handwheel 73 in the opposite direction. Collets for supporting and clamping tools of various sizes may be quickly removed and attached to the head 38 in this manner.

The sleeve 53 has an index plate 81 secured thereto on a key 82. A key slot 83, in which the key 82 projects, is aligned with and disposed in extension of a slot 84 on its face and with an index slot 85 on its periphery. A key 86 is secured in the slot 84 in the face of the index plate by an extending stud 87 which is riveted thereto. The key 86 extends within a slot 88 in the face of a cam ring 89 which permits the ring to adjust itself on the sleeve 53. Any play between the cam ring 89 and the sleeve 53 will not operate to change the amount of tilting movement produced to the head. A knurled nut 91 is threaded on the end of the sleeve 53 to secure the cam ring 89 thereon.

It will be noted from Fig. 2 that when the roller 44 is disposed at a dwell portion of the cam, the index slot 85 is in position to be engaged by the index pin. An additional slot 90 which is similar to slot 88 is provided on the opposite side of the cam ring 89. This permits the cam ring to be mounted with either face disposed adjacent to the index plate to change from a right to a left hand cam ring. With the roller 44 disposed in a dwell portion of the cam, the index slot 85 will be in a vertical position in either position of the cam ring 89.

A slot 92 on the top of the housing 49 receives the index device 93 which is secured in position by a screw 94. The index device embodies a spring pressed index pin 95 having a frusto-conical end portion 96 which projects within the slot 85 in the index plate 81. A head 97 is secured on the pin 95 by which the end portion 96 may be withdrawn from the slot 85. The pin 95 locks the spindle 53 in predetermined position when engaging any one of the index slots 85, to thereby secure the workpiece in automatic timed positions relative to the grinding wheel.

A gauging element 98, illustrated in Figs. 6 and 7, may be secured in the slot 92 by a screw 99. The screw projects through a slot 101 in the body portion 100 of the element so that the device may be adjusted longitudinally within the slot 92. A pivoted gauging finger 102 projects from the element 98 having its indexing face disposed upon the axis of the body portion 100 of the device. This permits the element to be mounted in the slot as shown or when turned over to gauge either a right or left hand face of a slot of a tool to be positioned thereby. When the plunger 95 has its end 96 projecting within the slot 85 of the index plate 81, the workpiece 69 may then be inserted within the collet 66 to abut against the rod 76, as illustrated in the figure. Thereafter, the workpiece is rotated to have a face of a slot therein aligned with the face of the finger 102 if a flute is to be dressed therein approximately on center, as illustrated in Fig. 9. Thereafter the workpiece is securely clamped by the turning of the handwheel 73 which draws the collet within the sleeve 53.

If radial relief is to be ground on a fluted workpiece such as a tap, the tap is adjusted in the collet to have the center of the flute aligned with the center of the tap and wheel on the wheel side, as illustrated in Fig. 1. With the index pin 95 in engaged position and the workpiece supported and driven by the collet, the workpiece is automatically timed with the unit and wheel in any engagement of the index pin 95 with a slot in the index plate 81. The index pin 95 is withdrawn to permit the workpiece to be rotated by the turning of the handwheel 73 which rotates the sleeve 53 on the balls 58 and 62. This rotation produces the oscillation of the head 38 and the workpiece a number of times for each revolution, depending upon the number of cam faces provided upon the cam ring 89.

In Fig. 2 the cam ring 89 is illustrated by way of example as having three cam lobes 103, all of which are of the same arcuate slope, and it is to be understood that any number of cam lobes 103 may be reproduced on a cam ring. The method of producing these like arcuate cam lobes which blend from the periphery of a circle struck about a center of the cam ring will be explained more fully hereinafter. The cam having the three cam lobes 103 is employed for relieving the lands of a workpiece having three flutes therein, such as the tap 69. The relief is applied to the three rows of threads rearwardly of the front cutting edges. Such relief is produced when a cam lobe 103 contacting the cam roller 44 forces the axis of the head 38 away from the roller, which thereby forces the surface to be relieved progressively toward the grinding wheel. The cam lobe will then drop off of the roller 44 so that the axis of the head 38 will be moved back to its initial position by the tension in the spring 47 which may be adjusted by the thumb screw 46.

During the relieving operation, the handle 13 may be operated through an arc to move the platen 12 and therefore the head 38 and workpiece 69 across the grinding wheel, the axis of which is disposed parallel to that of the tool. All of the rows of surfaces to be relieved are progressively ground simultaneously as the operator continuously rotates the handwheel 73 and oscillates the handle 13. Lateral feed is applied between the wheel and the workpiece through the adjustment of the handwheel 18. The platen 15 has a motor riser frame 104 on a base 105 secured thereto by a bolt 110 which is tightened by a rod 111. The frame supports a lead screw 106 which is operated by a handwheel 107. The lead screw adjusts a grinding wheel supporting carriage 108 on the upright 104. An index finger 109 projects adjacent to the periphery of the wheel 107, by which a fine adjustment may be indicated.

The base 105 may be adjusted about its center and clamped in any position by the bolt 110 to have the abrasive wheels 112 and 113 disposed at any angle to the axis of the workpiece 69. The base of the motor riser frame 104 may be shifted from the rear center 153 of the platen 15 to the forward center 154, as illustrated in Fig. 13. This permits the grinding wheel to be swung around over the platen 12 to be aligned with a flute of a tool supported in the head 38, as illustrated in Fig. 9, or to operate on a workpiece 155 supported directly on the platen, as illustrated in Fig. 13 or on a fixture secured thereto.

The motor 114 is mounted on the carriage 108, the shaft 115 of which supports and rotates the grinding wheels 112 and 113. Suitable guards 116 are carried by the motor frame for the protecting of the operator, and the motor is driven through an electric circuit in the conventional manner. A plate 118 extends upwardly from the base 10 adjacent to the side of the table 12 in a position to engage blocks 119 which are adjustable in a slot 121 and secured in position by the screws 122. The blocks 119 are adjustable on the side of the platen 12 for limiting the degree of its reciprocating movement.

A boss 123 projects from the side of the housing 49 in which a shaft 124 is adjustably retained by set screws 125. The shaft 124 supports a split bushing 126 upon which an outboard supporting element 127 is secured by a screw 128. A clamping screw 129 secures the split boss to the shaft after the male center 131 on the supporting element 127 is moved into engagement with the female center in the end of the workpiece. The opposite end of the supporting element 127 is provided with a female center 132 into which a male center on the end of the workpiece may project to form the support. The dog point of a locating screw 156 in the bushing 126 projects into a slot 157 in the shaft 124 to prevent the turning of the bushing on the shaft so that the center 131 is retained aligned with the center of the sleeve 53.

The present machine has many uses. As illustrated in Fig. 9, the flutes in a workpiece, such as a tap 69, may be ground when the plane in which the wheel 113 operates is disposed parallel to the axis of the tap. The wheel is aligned with the slot through the adjustment of the handwheel 18 and is fed toward the axis of the tap by the handwheel 107. The tap is prevented from turning by the index plate 81 and the handle 13 is oscillated to reciprocate the tap along the periphery of the grinding wheel. When the depth of the flute is to be inclined, the base 24 is tilted, as illustrated in Fig. 3. After grinding one of a plurality of flutes in a tool in this manner, the plunger 95 is then raised to permit the tool to be indexed to have the next adjacent flute machined by the wheel.

When the surface of a workpiece, such as the teeth of a tap, are to be relieved, the base 105 of the motor riser frame 104 is swung through 90 degrees to have the face of the grinding wheel 112 disposed parallel to the platen 12 and the head 38 is adjusted to present the workpiece at the required angle. The wheel is fed downwardly into center position with the tool by the handwheel 107 and into grinding position by the handwheel 18. If four flutes are provided in a workpiece, such as a tap, leaving four rows of surfaces to be relieved and pointed, a cam having four cam lobes 103 and an index plate having four slots 85 are secured to the sleeve 53. When the pin 96 of the plunger 95 is disposed in any of the slots 85 of the index plate, the workpiece is rotated to have the center of the flute aligned with the center of the workpiece and wheel on the wheel side and is thereafter clamped in position. This automatically times the workpiece and wheel without the use of separate locating devices relative to all of the index slots 85 and associated cam surfaces. The workpiece may be supported by the shank alone, as illustrated in Figs. 5 and 9, or by the shank and an outboard bearing as illustrated in Fig. 4, or as illustrated in Fig. 1, both ends of the workpiece may be supported on centers and driven by a dog 170.

As the handwheel 73 is rotated, each cam lobe 103 will operate on the roller 44 and cause the head 38 to tilt toward the face of the grinding stone so that the surfaces of the lands toward the face of the grinding stone are relieved from the front edge toward the heel thereof. In the operations just described the axis of the collet 66 and work is disposed parallel to the axis of the shaft 34. An axial feed may be provided to the workpiece by operating the handle 13 when the width of the face of the wheel is less than the length of relief required.

When it is desired to provide not only a radial relief to the cutting edges, as above described, but also an angular relief to a radial plane, the axis of the collet 66 is set off angularly to that of the shaft 34. This crossed relation of the axes of the collet and shaft 34 produces a compound radial and angular movement to the oscillatory head 38 so that a radial and angular relief will be provided to the tool dressed thereby. When the head 38 is disposed angularly to the shaft 34, adjustment may then be made to the plate 29 on the base 24 to bring the axes of the head and workpiece parallel to the direction of reciprocation of the platen 12. The operation of the cam faces 103 on the roller 44 will produce not only the radial relieving mentioned above, but also a forward movement to the head and tool relative to the plane of the wheel so as to produce angular relief to a radial cutting edge.

In Fig. 8 I have illustrated a centering tool wherein the cutting edge 134 has slight radial relief to prevent drift while the cutting edges 135 and 136 have both radial and angular relief. All of the reliefs were produced by a form grinding wheel when the tool was oscillated in the direction of the resultant of the forward and lateral movements. The lateral oscillation alone of the head 38 will not relieve radial cutting edges, but the resultant forward and lateral movements produced by crossing the axes of the tool and the shaft 34 when the single cam plate 48 operates on the single roller 44, provides the compound relief during the single dressing operation of the tool. The production of this compound relief by the operation of the cam plate 48 with the roller 44 is considered new and novel, and provides a method of relieving all of the cutting edges of any rotatable form cutting tool irrespective of whether any angular or radial relief is required. The employment of the plates 36 and base 39 and the plate 29 and base 24 provides universal adjustment to the supporting head 38. The head may be employed for any relative degree of compound tilting of the work toward and across the face of the tool. For any specific application of the compound tilting movement the plates 29 and 36 and the base 39 may be omitted and the head 38 fixed directly to the sleeve 35 and the bosses 33 attached to the base plate 24. The axis of the head 38 will be in crossed relationship with the shaft 34 and will be parallel to or substantially parallel to the direction of movement of the table 12, depending upon the angle of point to be dressed on the workpiece.

Referring to Figure 10, a master cam 159 is illustrated which comprises a washerlike plate 161 having a slot 162 in its periphery. An arcuate segment 163 has an arcuate surface 164 struck from a center on a slightly smaller radius than that from which the circumference of the plate 161 was struck. One end of the sector is secured by a pivot 165 within the slot 162 with the surface 164 blending into the surface of the circumference of the plate 161. The opposite end of the segment 163 is secured in adjustable fixed position by a pair of studs 166 and 167. The periphery of the plate 161 is cut away at 168 so that the sector will project above the edge of the plate at this point.

When the cam 159 is mounted on the head 38 and a cam ring is supported on the front end of the head adjacent to the grinding wheel, the operation of the roller 44 on the face of the sector 163 will cause the head, and therefore the plate, to move away from the grinding wheel to grind a corresponding cam surface on the plate. It will be noted that the fall in the cam surfaces of the sector 163 produces a rise on the cam surface being produced on the plate. The single segment 163 will be used while grinding each of the cam faces on the cam plate to thereby produce cam faces which are exactly alike. After a cam with a plurality of cam surfaces has been ground in this manner from the cam having the single cam face it may be employed as a master for reproducing any number of the cams having multiple cam surfaces.

Referring to Figs. 11 and 12, the center and driver 170 is illustrated as embodying a shank portion 169 having a shouldered portion 171 and a center point 172. A rod 173 extends through the shoulder 171 in aligned relation with the axis of the shank 169 and carries an angular shaped driving element 174 on its end secured thereto by a screw 175. A flat face 176 on the driver 174 engages a flat face 177 on the workpiece to rotate the workpiece in timed relation with the shank 169. A screw 178 secures the rod 173 in adjusted position.

In Figure 14 the base 24 is illustrated as having the trunnions 33 attached directly thereto. The base 24 is provided with apertures 180 with which the ends of the studs 23 engage when the base is to be tilted upwardly, as in Figure 3. As illustrated in the present figure, the base is mounted on a center 179 for angular adjustment indicated by a finger 181 and the index marks 182. The workpiece 183 may be set off in this manner relative to the grinding wheel an amount equal to the angle of the point to be dressed on the workpiece. The trunnions may be directly attached to the base when the axis of the head is parallel to the axis of the trunnions or when disposed at a fixed angle relative thereto.

From the drawings it will be understood that the grinding machine of the present invention is of the universal type, being capable of grinding slots or flats on any type of workpiece which may be clamped to the platen or to a fixture mounted thereon. The machine is also useful for relieving the cutting edges radially as well as producing combined radial and angular relief to the cutting edges of tools. The relief may be applied to the angularly disposed point of the tool as well as to the body thereof which is parallel to the tool axis. The production of the combined radial and angular relief is accomplished through the employment of a single cam plate which oscillates the tool supporting head in a combined forward and sideward movement. When the arm 37 is forced upwardly to tilt the cam on the head 38 away from the roller 44, the oscillating action is eliminated from the head and workpiece and a cylindrical surface may then be ground thereon.

What is claimed is:

1. In a machine, a work supporting head, a cam on said head, a base, oscillatory means on said base, means for supporting said head above said oscillatory means for angular adjustment about a vertical axis, a roller on said base against which said cam is urged for oscillating said head, and a support on which said base is angularly adjusted.

2. In a machine, an oscillatory work supporting head, trunnions on which said head oscillates, means for adjusting said trunnions at an angle to said head, a cam on said head by which said head is oscillated, and means for adjusting the head and trunnions angularly as a unit.

3. In a machine, an oscillatory work supporting head, trunnions on which said head oscillates, means for adjusting said head at an angle to the trunnions, means for adjusting the head and trunnions at an angle, and means for moving said head to produce an oscillatory tilting movement thereto when the axis of the head is disposed at an angle to the axis of the trunnions.

4. In a grinding machine having a base, a rotatable grinding wheel, a tool supporting head, trunnions on which said head is oscillated, means for adjusting said head at an angle to the axis of said trunnions, means for adjusting said trunnions and head angularly relative to said grinding wheel, and means for oscillating said head and tool on the trunnions while tilting said head and tool in the plane of their axes.

5. In a grinding machine, a work supporting platen which is movable longitudinally, a grinding wheel supporting platen movable at right angles to said work supporting platen, a tilting head supported on said work supporting platen, a grinding wheel supported on said grinding wheel supporting platen and adjustable vertically and angularly thereon about a vertical axis in either a forward or rearward position, means for angularly adjusting said head on said first platen to adjust the work relative to the grinding wheel, and means for tilting said head.

6. In a grinding machine, an oscillatory head, a spindle on said head, an index plate on said spindle, a cam on said spindle, a key and slot connection between the mating faces of said plate and cam to permit the cam to freely adjust itself on said spindle.

7. In a grinding machine, an oscillatory head, a spindle on said head, an index plate on said spindle, a cam on said spindle, a key and slot connection between the mating faces of said plate and cam, said index plate having a stop notch for each cam surface on the cam, a roller against which said cam is urged, and means for supporting a workpiece in said spindle in automatically adjusted position relative to the plurality of notches and cam surfaces.

8. In a grinding machine, an oscillatory head for supporting a workpiece with its axis disposed at an angle to the axis of oscillation, a cam for producing a combined oscillating and tilting movement to said head, said cam being of truncated conical shape with the faces of the cam surfaces thereof disposed at an angle to the axis of the head, and a cylindrical roller engageable with said cam surfaces.

9. In a grinding machine, an oscillatory head, a cam for oscillating said head, said cam having a peripheral groove, and an arcuate segment pivoted at one end in said groove and adjustably secured at its other end, said segment being struck from an arc of smaller radius than the circumference of said cam.

10. In a grinding machine, a work supporting head, a shaft on which said head is oscillatably mounted, a cam on said head, and means supporting said head at an angle to the shaft to cause it to tilt at an angle when oscillated by the cam.

11. In a grinding machine for an element having a flute, a head having a rotatable sleeve, a collet in said sleeve, a center in said collet and an adjustable rod extending laterally through the body of the center having a laterally disposed flat surface engageable with a flute on said element for driving the element.

12. In a cam, a disc having a cam surface on its edge provided with a large initial drop produced by striking a circular arc of smaller radius than the arc of the disc from a point on the edge of the disc with the center from which the arc was struck moved from the center of the disc toward the cam surface on a radial line and shifted laterally of said radial line.

13. In a grinding machine, an oscillatory head, a cam for oscillating said head, said cam embodying a disc having a plurality of like cam surfaces on its edges, said surfaces being struck on a circular arc of smaller radius than the radius of the disc with the center offset from that of the disc on a radial line and shifted laterally of said radial line.

14. In a machine, a base which is angularly adjusted about its center, a shaft carried by said base with its axis disposed normal to said center, a work supporting head having an axis substantially parallel to said shaft, means supporting said head on said shaft which permits the head to be angularly adjusted relative to said shaft in a plane substantially parallel to the plane in which the base is adjusted.

15. In a machine, a base angularly adjusted about a vertical center, a shaft on said base having its axis disposed horizontally, a work supporting head, and a support adjustable about a vertical axis for attaching said head to said shaft for producing a compound tilting movement to the head about said shaft and in the plane of the axis of said shaft.

16. In a machine, a work supporting head, a shaft disposed at an angle to the axis of the head, and cam means for oscillating said head on said shaft laterally of its axis to have its axis tilt longitudinally of its length.

17. In a machine, a base, a plate adjustable about a vertical axis, a head, a shaft for supporting said head for oscillation, means between said head and shaft for permitting said head to be adjusted about a vertical axis, a cam mounted on said head, and a roller adjustable on an arc about said vertical axis for engagement with said cam in various positions of adjustment of said head.

18. In a machine, a base, a plate adjustable about a vertical axis, a head, a shaft for supporting said head for oscillation, means between said head and shaft for permitting said head to be adjusted about a vertical axis, a cam mounted on said head, a roller adjustable on an arc about said vertical axis for engagement with said cam in various positions of adjustment of said head, and means for resiliently urging said cam into engagement with said roller.

19. A cam for oscillating a head of a grinding machine embodying a circular plate having a cam surface formed thereon by a circular arc of smaller radius than that of the circle of the plate with the center of the circular arc so located that the circular arc if extended would cross the circumference of the plate at a substantial angle relative thereto.

20. A cam for oscillating a head of a grinding machine embodying a circular plate having a plurality of cam surfaces formed thereon by circular arcs having smaller radii than the radius of the circular plate with the centers of the circular arcs so located that the circular arcs if extended would cross the circumference of the plate at a substantial angle relative thereto.

21. In a machine having a longitudinal axis disposed in a horizontal plane, a work supporting head having an axis upon which the work is supported, an element having an axis on which said head is tiltably mounted, the axis of the head and the axis of the element being parallel to each other and to said longitudinal axis of the machine, a base supporting said element, means supporting said base on said machine, said head, element and base being adjustable angularly relative to each other in horizontal planes, a roller on said base, and a cam on said head engageable with said roller when the axes of the head and machine are parallel and with the axis of the element disposed out of parallel relation thereto, the degree of said out of parallel relationship controlling the degree of tilt to the head laterally and parallel to the longitudinal axis of the machine when the cam is rotated relative to the roller.

ORLIE W. DAWSON.